Patented Aug. 11, 1931

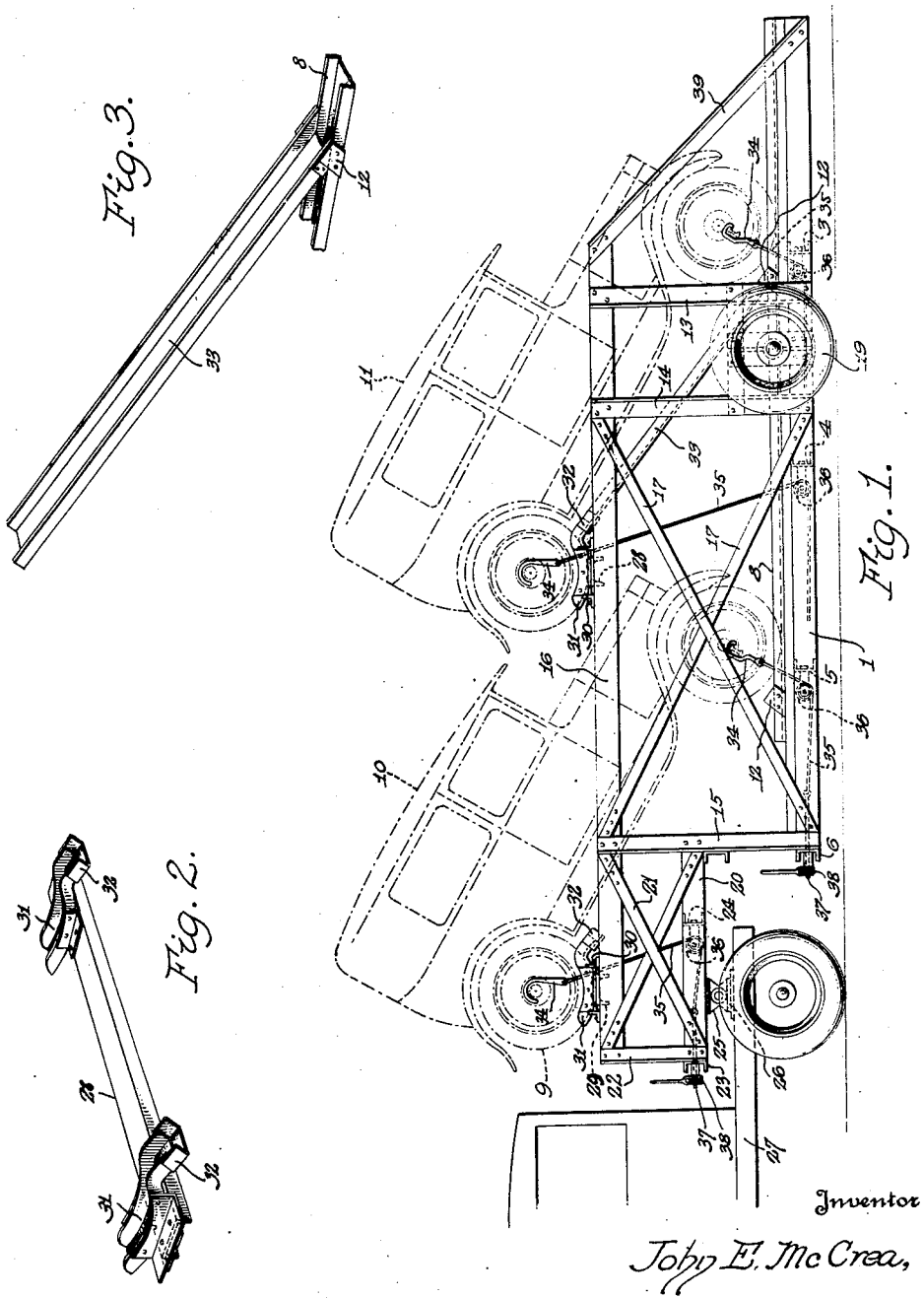

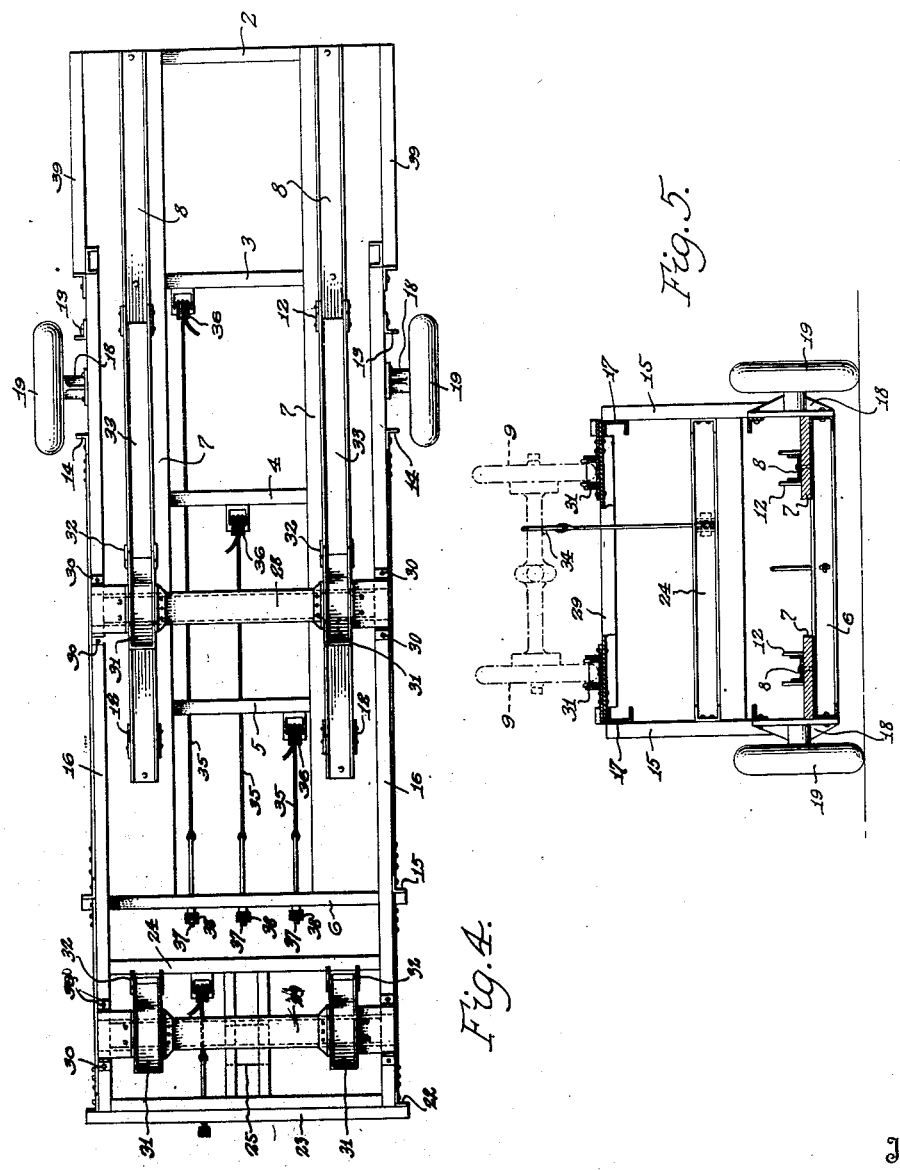

1,818,342

UNITED STATES PATENT OFFICE

JOHN E. McCREA, OF DETROIT, MICHIGAN, ASSIGNOR TO DEALERS MOTOR TRANSPORT INC., OF DETROIT, MICHIGAN, A CORPORATION OF MICHIGAN

SYSTEM OF AUTOMOBILE LOADING AND TRANSPORTATION

Application filed December 15, 1926, Serial No. 154,881. Renewed January 5, 1931.

My invention aims to provide a novel system of packing and transporting vehicles so that the same may be safely carried without occupying a comparatively large space. In the automotive industry special railway cars are used for transporting automobiles and in some instances the automobiles are packed or decked in superposed relation which often necessitates removing parts of the automobiles. Furthermore, automobiles or parts thereof are often transported from one factory to another on special designed trucks which are limited as to overall length and consequently the carrying capacity of such trucks is not very great. In both instances there are inconveniences, limitations and laborious handling which my invention aims to obviate by placing automobiles or similar vehicles in a compact overlapped relation approaching the perpendicular so that the automobiles will occupy minimum space, and yet be substantially packed so that the automobiles may be quickly unpacked for immediate use, which is in contradistinction to the packing of automobiles from which parts have been removed and must be replaced in order to be used. Such overlapped packing of the automobiles is applicable to railway rolling stock, but has been specially adapted for a trailer or towed vehicle adapted for safely moving automobiles from one location to another. The trailer has been designed so that automobiles may be run thereon, placed in cradles, and anchored whereby the automobiles cannot become accidentally displaced during transportion. As set forth in the beginning, such load carrying vehicles are restricted as to length and I aim to place a maximum number of automobiles on such a trailer, which may be safely towed or moved about just as though the automobiles were horizontally supported on the vehicle.

My invention further aims to provide a tractor trailer combination wherein the trailer affords a comparatively light and rigid framework having ways and cradles to facilitate placing automobiles, one at a time, on the trailer with the rear portion of one automobile overlapping the front portion of an adjacent automobile, whereby the automobiles will be supported at an inclination to the horizontal and occupy less space than in horizontal positions.

The construction by which I attain the above results will be hereinafter specifically described, and then claimed, and reference will now be had to the drawings wherein Figure 1 is a side elevation of a tractor trailer combination showing automobiles packed for transportation;

Fig. 2 is a perspective view of wheel cradles;

Fig. 3 is a perspective view of a skid or loading way;

Fig. 4 is a plan of the trailer, and

Fig. 5 is a cross sectional view of the same, looking towards the forward end of the trailer.

The trailer or towed vehicle is constructed mainly of structural steel, using such standard shapes as angle and channel bars, flat plate bars and the like, which are assembled to provide a rigid skeleton frame. The trailer frame-work includes a substantially horizontally disposed oblong base frame 1 that may be considered as a chassis. This base frame has a series of transverse members 2, 3, 4, 5 and 6. On the transverse members 2 to 5 inclusive, at the sides of the frame, are longitudinal supports 7 which may be in the form of planks or wooden members. Secured on these supports are channel rails 8 serving as run-ways for the wheels 9 of automobiles 10 and 11. At certain intervals the channel rails 8 are provided with pairs of abutments 12.

On the sides of the frame 1 are uprights 13, 14 and 15, supporting longitudinal deck members 16 which are connected to the frame 1 by diagonally disposed side members 17. The uprights 13 and 14 are connected by axle members or journal boxes 18 to the rear wheels 19 of the trailer, said wheels cooperating with the axle members 18 and the frame 1 in forming a rear axle assembly for the chassis of the trailer. The wheels 19 may be considered as having stub axles in the journal boxes 18 so that the trailer is devoid of an actual transverse axle, thus leaving the channel rails 8 unobstructed from the rear end of the frame 1 to the forward end thereof.

The deck members 16 have the forward ends thereof extending forwardly from the uprights 15 so as to cooperate with an auxiliary base frame 20, side members 21, vertical members 22 and transverse members 23 and 24 in forming an overhanging trailer end member which may be coupled, as at 25 to a fifth wheel structure 26 on the rear end of a tractor 27 or other form of towing vehicle. Various forms of couplings or universal mountings may be used for detachably or permanently connecting the forward end of the trailer to the rear end of the tractor, and the overhanging forward end of the trailer permits of a short coupled relation between the tractor and trailer without interfering with an operative relation between the tractor and trailer essential for control of the trailer from the tractor.

The deck members 16 may be connected by detachable transverse beams 28 and 29, one of which is shown in Fig. 2. These beams are identical in construction and the ends thereof may be constructed to interlock with the deck members 16 whereby the beams cannot become accidentally displaced. As shown, the ends of the beams fit between angle brackets 30 on the deck members. On the beams are substantially braced cradles or concave channel chock blocks 31 adapted to receive the rear wheels of the automobiles, as best shown in Fig. 1. The cradles 31 have the rear ends thereof provided with sockets 32 adapted to receive the upper ends of channel skids 33 which are adapted to have the lower ends thereof rest on the channel rails 8 against the abutments 12. These skids will be a continuation of the rails 8 for loading the trailer and after a set of the skids have been used for loading the automobile 10, the same set of skids can be placed in position for loading the automobile 11. If desired, the skids may be left in position, as shown in Fig. 1, and obviously a somewhat similar set of skids can be used to afford a track for the automobiles from the ground or floor on to the channel rails 8.

To load the automobile 10 the transverse beam 28 is removed, and the reader will understand that the beams 28 and 29 are used mainly as supports for the cradles 31, but as a matter of fact, the central portion of the beam 29 can be dispensed with and the forward cradles rigidly supported from the deck members 16, while the beam 28 may be eliminated and the rear set of cradles 31 detachably supported from the deck members 16.

Means is provided for anchoring the automobiles 10 and 11 in their inclined overlapping positions. After the automobile 10 is placed in an inclined position on the forward end of a trailer, a hook or other axle engaging member 34 is placed in engagement with the front axle of the automobile 10. The hook 34 is carried by a flexible member or cable 35 trained under a sheave 36 on the transverse member 5 of the base frame. Attached to the cable 35 is a take-up screw 37 operable by a nut and ratchet mechanism 38 supported from the transverse member 6 of the base frame. The cable 35 can be tightened so as to anchor the front axle assembly of the automobile 10 relative to the channel rails 8.

The rear axle assembly of the automobile 10 is also clamped down so that the rear wheels 9 cannot become displaced relative to the rear cradles 31. The anchoring means for the rear axle has elements similar to the anchoring means for the front axle, said rear axle anchoring means being supported from the transverse members 23 and 24 of the overhanging front end structure of the trailer.

There are axle anchoring means for the automobile 11, said anchoring means being supported from the transverse members 3 and 4 and operatable at the transverse member 6.

The rear ends of the deck members 16 may be braced relative to the rear end of the base frame 1 by angularly disposed braces 39.

I attach considerable importance to the fact that the automobiles 10 and 11 are placed at an inclination to the horizontal with the rear end of the automobile 11 overlapping or superposed relative to the forward end of the automobile 10. This is suggestive of lowering the rear cradles 31 because the rear wheels of the automobile 11 can extend downwardly in proximity to the front wheel fenders of the automobile 10, just so that the rear axle housing of the automobile 11 does not contact with the engine hood of the automobile 10. The arrangement is also suggestive of placing the automobiles at other angles to the perpendicular, but the angle has been selected which is safe for supporting the average automobile weight.

By removing the trailer wheels 19 and the journal boxes 18 there is formed a packing frame for the automobiles that can be placed on flat bottom freight cars or any box cars and for this reason I do not care to confine my invention specifically to a trailer or wheeled vehicle, because the system of loading and compactly arranging the automobiles may be utilized for automobile storage or other purposes.

One embodiment of my invention has been illustrated, but it is to be understood that the structural elements are susceptible to such variations and modifications as fall within the scope of the appended claims.

What I claim is:—

1. A trailer for transporting automobiles comprising a frame, wheels journalled to the rear of said frame, an overhanging forward end, said overhanging end being adapted for coupling to a tractor, channel rails on said frame, cradles on the frame above the rails and adapted for receiving the rear wheels of an automobile with the front wheels resting on said rails for holding an automobile in an inclined position, and anchoring means upon the frame adjacent the front and rear axles of the automobile, said anchoring means comprising a ratchet, a means for operating said ratchet and a flexible connection attached to said ratchet and adapted to engage the axle of the automobile.

2. A trailer for transporting automobiles comprising a frame, rear wheels journalled on said frame, an overhanging front end attached to said frame, said overhanging end being adapted for connection to a tractor, channel rails carried by the frame, cradles attached to the frame above the rails, skids adapted to be received at one end by a cradle and the lower end in the channel rails to facilitate placing the rear wheels of an automobile in the cradle with the front wheels resting in the channel rails for supporting the automobile at an inclination to the horizontal.

3. A trailer for transporting automobiles comprising a frame, rear wheels journalled on said frame, an overhanging front end attached to said frame, said overhanging end being adapted for connection to a tractor, channel rails carried by the frame, cradles attached to the frame above the rails whereby an automobile may be supported at an inclination to the horizontal with its rear wheels in said cradles and its front wheels resting in the channel rails.

4. A vehicle for transporting automobiles or the like, comprising in combination, a tractor, a semi-trailer, a fifth wheel connection between the tractor and the forward end of the semi-trailer, whereby the tractor supports this end of the semi-trailer, supporting wheels for the other end of the semi-trailer, a side frame on each side of the semi-trailer, means on the frames for supporting one or more automobiles with one end elevated and the automobiles in inclined position, said frames extending forwardly of the said fifth wheel connection whereby the end of the forwardmost automobile materially overlaps the tractor.

5. A vehicle for transporting automobiles or the like comprising in combination, a tractor provided with a driver's cab and rear driving wheels, a semi-trailer, a fifth wheel connection between the rear end of the tractor and the forward end of the semi-trailer, supporting wheels for the rear end of the semi-trailer, a frame on each side of the semi-trailer running lengthwise thereof, means on the frame for supporting one or more automobiles with one end elevated, said frames extending forwardly and terminating in close proximity to the driver's cab whereby the forwardmost automobile materially overlaps the tractor with its end supported in close proximity to the driver's cab so that substantially all available space at the rear of the driver's cab on the tractor is utilized.

6. A vehicle for transporting automobiles or the like comprising in combination, a tractor provided with a driver's cab and rear driving wheels, a semi-trailer, a fifth wheel connection between the rear end of the tractor and the forward end of the semi-trailer, supporting wheels for the rear end of the semi-trailer, means on the trailer positioned forwardly of the fifth wheel and in close proximity to the driver's cab and supporting an automobile with one end elevated so that the end thereof is in close proximity to the driver's cab whereby all available space to the rear of the driver's cab on the tractor is utilized.

In testimony whereof I affix my signature.

JOHN E. McCREA.